United States Patent
McDonald et al.

(10) Patent No.: US 12,138,985 B2
(45) Date of Patent: Nov. 12, 2024

(54) TRAILER COMPARTMENT TRANSPORTATION REFRIGERATION UNIT OPERATION VISUALIZATION

(71) Applicant: Carrier Corporation, Palm Beach Gardens, FL (US)

(72) Inventors: Patrick McDonald, Athens, GA (US); John F. Hannon, Pennellville, NY (US); Mark Fragnito, Watkinsville, GA (US); Deborah A. Champagne, North Syracuse, NY (US); Thaison Phan, Syracuse, NY (US); Ken Shuart, Danielsville, GA (US); Vohn McLeish, Athens, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 256 days.

(21) Appl. No.: 17/255,194

(22) PCT Filed: Jul. 27, 2020

(86) PCT No.: PCT/US2020/043701
§ 371 (c)(1),
(2) Date: Dec. 22, 2020

(87) PCT Pub. No.: WO2021/021711
PCT Pub. Date: Feb. 4, 2021

(65) Prior Publication Data
US 2022/0297498 A1    Sep. 22, 2022

Related U.S. Application Data

(60) Provisional application No. 62/880,365, filed on Jul. 30, 2019, provisional application No. 62/882,739, filed on Aug. 5, 2019.

(51) Int. Cl.
*B60H 1/00* (2006.01)
*B62D 33/04* (2006.01)
*F25D 11/00* (2006.01)

(52) U.S. Cl.
CPC ....... *B60H 1/00014* (2013.01); *B62D 33/042* (2013.01); *F25D 11/003* (2013.01); *F25D 2400/36* (2013.01)

(58) Field of Classification Search
CPC ............ B60H 1/00014; B60H 1/00021; B62D 33/042; B62D 33/048; F25D 11/003;
(Continued)

(56) References Cited

U.S. PATENT DOCUMENTS

| 4,455,096 A | 6/1984 | Brandstedt |
| 4,851,822 A | 7/1989 | Barnett |

(Continued)

FOREIGN PATENT DOCUMENTS

| CN | B04180362 S | 6/2017 |
| EP | 2105688 A2 | 9/2009 |

(Continued)

OTHER PUBLICATIONS

International Search Report; International Application No. PCT/US2020/043701; International Filing Date Jul. 27, 2020; Date of Mailing Oct. 15, 2020; 6 pages.

(Continued)

*Primary Examiner* — Raheena R Malik
(74) *Attorney, Agent, or Firm* — CANTOR COLBURN LLP

(57) ABSTRACT

A transport refrigeration system including a refrigerated cargo space subdivided into one or more compartments including a first compartment; a transportation refrigeration unit configured to provide conditioned air to each of the one or more compartments; and a display configured to generate (Continued)

a graphical user interface comprising one or more graphical user interface sections, wherein the one or more graphical user interface sections comprise a first graphical user interface section associated with the first compartment, wherein the first graphical user interface section displays operating parameters for the first compartment, and wherein the first graphical user interface section displays a compartment icon illustrating a current compartment layout of the one or more compartments and identifies the first compartment.

15 Claims, 11 Drawing Sheets

(58) Field of Classification Search
CPC .. F25D 2400/36; F25D 11/02; F25D 2400/38; F25D 2400/361; B60P 3/20
See application file for complete search history.

(56) References Cited

U.S. PATENT DOCUMENTS

| | | |
|---|---|---|
| D449,837 S | 10/2001 | Moody |
| D454,574 S | 3/2002 | Wasko et al. |
| D455,758 S | 4/2002 | Buzzard et al. |
| 6,862,499 B1 | 3/2005 | Cretella et al. |
| D521,521 S | 5/2006 | Jewitt et al. |
| D534,542 S | 1/2007 | Jewitt et al. |
| D553,097 S | 10/2007 | Lemke et al. |
| D556,062 S | 11/2007 | Boudewyns et al. |
| D557,661 S | 12/2007 | Lemke et al. |
| D582,426 S | 12/2008 | Chen et al. |
| D596,195 S | 7/2009 | Wall et al. |
| D630,649 S | 1/2011 | Tokunaga et al. |
| 8,004,507 B2 | 8/2011 | Boudewyns et al. |
| D652,050 S | 1/2012 | Chaudhri |
| D652,839 S | 1/2012 | Tokunaga et al. |
| D656,153 S | 3/2012 | Imamura et al. |
| D667,840 S | 9/2012 | Anzures |
| D667,843 S | 9/2012 | Baumann |
| D695,763 S | 12/2013 | Tagliabue et al. |
| D697,071 S | 1/2014 | Brinda |
| D702,248 S | 4/2014 | Carlin et al. |
| D707,709 S | 6/2014 | Baumann |
| 8,766,911 B2 | 7/2014 | Waller et al. |
| D719,173 S | 12/2014 | Tsuru et al. |
| D719,181 S | 12/2014 | Sik et al. |
| D719,182 S | 12/2014 | Sik et al. |
| D721,096 S | 1/2015 | Pereira |
| D721,385 S | 1/2015 | Barling et al. |
| D722,324 S | 2/2015 | Florence et al. |
| D726,214 S | 4/2015 | Wantland et al. |
| D728,603 S | 5/2015 | Bergher |
| D733,752 S | 7/2015 | Kim et al. |
| 9,075,956 B2 | 7/2015 | Dudley et al. |
| D738,899 S | 9/2015 | Herold et al. |
| D739,426 S | 9/2015 | Herold et al. |
| D743,420 S | 11/2015 | Herold et al. |
| D743,996 S | 11/2015 | Herold et al. |
| D754,707 S | 4/2016 | Zurn |
| D758,379 S | 6/2016 | Kodosh |
| D759,036 S | 6/2016 | Kadosh |
| D762,238 S | 7/2016 | Day et al. |
| D768,185 S | 10/2016 | Lee et al. |
| D768,198 S | 10/2016 | Lee et al. |
| D768,647 S | 10/2016 | Bauer et al. |
| 9,460,410 B2 | 10/2016 | Hill et al. |
| D775,643 S | 1/2017 | Kovchiy |
| D775,668 S | 1/2017 | Murata et al. |
| D776,131 S | 1/2017 | Cartlidge |
| D781,910 S | 3/2017 | Day et al. |
| D782,503 S | 3/2017 | Lee et al. |
| D785,040 S | 4/2017 | Day et al. |
| D785,041 S | 4/2017 | Day et al. |
| D785,644 S | 5/2017 | Lam |
| D791,831 S | 7/2017 | Capela et al. |
| D797,130 S | 9/2017 | Ono et al. |
| D803,881 S | 11/2017 | Hurley et al. |
| 9,950,590 B2 | 4/2018 | Bryant et al. |
| D819,043 S | 5/2018 | Yamaura et al. |
| D819,058 S | 5/2018 | Clediere |
| D849,777 S | 5/2019 | Von Reden |
| D865,788 S | 11/2019 | Jostrand |
| D881,234 S | 4/2020 | Capela et al. |
| D894,230 S | 8/2020 | Butler et al. |
| D900,830 S | 11/2020 | Carrigan et al. |
| D900,859 S | 11/2020 | Satterlie et al. |
| D912,700 S | 3/2021 | Paul |
| D918,934 S | 5/2021 | Anderson et al. |
| 2003/0011643 A1 | 1/2003 | Nishihata |
| 2005/0198593 A1 | 9/2005 | Keely et al. |
| 2008/0209546 A1 | 8/2008 | Kim |
| 2009/0153436 A1 | 6/2009 | Ju et al. |
| 2009/0199113 A1 | 8/2009 | McWhinnie et al. |
| 2010/0262924 A1 | 10/2010 | Kalu |
| 2010/0275127 A1 | 10/2010 | Morita et al. |
| 2010/0281385 A1 | 11/2010 | Meaney et al. |
| 2011/0214440 A1* | 9/2011 | Kueny ................... F25D 29/00 62/125 |
| 2011/0225505 A1 | 9/2011 | Uchida et al. |
| 2013/0145460 A1 | 6/2013 | Dudley et al. |
| 2015/0005952 A1 | 1/2015 | Sasaki et al. |
| 2016/0266786 A1 | 9/2016 | Arnold et al. |
| 2017/0017392 A1 | 1/2017 | Castaneda et al. |
| 2017/0061521 A1 | 3/2017 | Lee et al. |
| 2017/0261255 A1* | 9/2017 | Saikkonen .............. G06F 3/167 |
| 2018/0266751 A1 | 9/2018 | Lim et al. |
| 2019/0369755 A1 | 12/2019 | Roper et al. |

FOREIGN PATENT DOCUMENTS

| | | |
|---|---|---|
| JP | 2014152981 A | 8/2014 |
| KR | 300514091 | 12/2008 |
| KR | 20140124151 A | 10/2014 |
| KR | 300843132 | 3/2016 |
| KR | 300925609 | 10/2017 |
| WO | 2018013545 A1 | 1/2018 |

OTHER PUBLICATIONS

Written Opinion of the International Searching Authority; International Application No. PCT/US2020/043701; International Filing Date Jul. 27, 2020; 8 pages.
"Style QI radio buttons to look similar to UISegmentedControl?" Mar. 15, 2013, posted at stackoverflow.com, [site visited Apr. 2, 2021]. https://stackoverflow.com/questions/15442459/style-qt-radio-buttons-to-look-similar-to-uisegmentedcontrol (Year: 2013); pp. 1-2.
"Truck/ Trailer Refrigeration Brazil" May 16, 2016, posted at carrier.com, [site visited Apr. 2, 2021]. https://www.carrier.com/truck-trailer/en/br/products (Year: 2016); pp. 1-3.
Novak, Robert, "Buttons countdown progress bar" Jul. 31, 2014, posted at sketchappsources.com, [site visited Apr. 14, 2021]. https://web.archive.org/web/20140731204636/https://www.sketchappsources.com/free-source/661-buttons-countdown-progress-bar-sketch-freebie-resource.html (Year: 2014); pp. 1-1.
Pilott, Matt, "Foundation for Beginners: Buttons and Dropdowns" Jun. 17, 2013, posted at webdesign.tutsplus.com, [site visited Apr. 2, 2021]. https://webdesign.tutsplus.com/articles/foundation-for-beginners-buttons-and-dropdowns--webdesign-12465 (Year: 2013); pp. 1-2.
U.S. Appl. No. 29/701,185, filed Aug. 8, 2019; Notice of Allowance mailed Apr. 21, 2021; pp. 1-21.
U.S. Appl. No. 29/726,548, filed Mar. 4, 2020; Non-Final Office Action mailed Apr. 19, 2021; pp. 1-16.
U.S. Appl. No. 29/726,548, filed Mar. 4, 2020; Notice of Allowance mailed May 27, 2021; pp. 1-12.
U.S. Appl. No. 29/726,550, filed Mar. 4, 2020; Non-Final Office Action mailed Apr. 19, 2021; pp. 1-16.
U.S. Appl. No. 29/726,550, filed Mar. 4, 2020; Notice of Allowance mailed May 27, 2021; pp. 1-12.

(56) References Cited

OTHER PUBLICATIONS

U.S. Appl. No. 29/726,552, filed Mar. 4, 2020; Non-Final Office Action mailed Apr. 19, 2021; pp. 1-16.
U.S. Appl. No. 29/726,552, filed Mar. 4, 2020; Notice of Allowance mailed May 27, 2021; pp. 1-12.
U.S. Appl. No. 29/726,553, filed Mar. 4, 2020; Non-Final Office Action mailed Apr. 19, 2021; pp. 1-16.
U.S. Appl. No. 29/726,553, filed Mar. 4, 2020; Notice of Allowance mailed May 27, 2021; pp. 1-12.
U.S. Appl. No. 29/726,554, filed Mar. 4, 2020; Non-Final Office Action mailed Apr. 19, 2021; pp. 1-16.
U.S. Appl. No. 29/726,554, filed Mar. 4, 2020; Notice of Allowance mailed May 27, 2021; pp. 1-12.
U.S. Appl. No. 29/726,557, filed Mar. 4, 2020; Non-Final Office Action mailed Apr. 19, 2021; pp. 1-16.
U.S. Appl. No. 29/726,557, filed Mar. 4, 2020; Notice of Allowance mailed May 27, 2021; pp. 1-12.
U.S. Appl. No. 29/726,574, filed Mar. 4, 2020; Non-Final Office Action mailed Apr. 21, 2021; pp. 1-16.
U.S. Appl. No. 29/726,578, filed Mar. 4, 2020; Non-Final Office Action mailed Apr. 21, 2021; pp. 1-16.
U.S. Appl. No. 29/726,579, filed Mar. 4, 2020; Non-Final Office Action mailed Apr. 21, 2021; pp. 1-16.
U.S. Appl. No. 29/726,581, filed Mar. 4, 2020; Non-Final Office Action mailed Apr. 21, 2021; pp. 1-16.
U.S. Appl. No. 29/726,585, filed Mar. 4, 2020; Non-Final Office Action mailed Apr. 21, 2021; pp. 1-16.
U.S. Appl. No. 29/726,586, filed Mar. 4, 2020; Non-Final Office Action mailed Apr. 21, 2021; pp. 1-16.
U.S. Appl. No. 29/726,590, filed Mar. 4, 2020; Non-Final Office Action mailed Apr. 21, 2021; pp. 1-16.
U.S. Appl. No. 29/726,574, filed Mar. 4, 2020; Notice of Allowance mailed Jun. 8, 2021; pp. 1-12.
U.S. Appl. No. 29/726,578, filed Mar. 4, 2020; Notice of Allowance mailed Jun. 8, 2021; pp. 1-12.
U.S. Appl. No. 29/726,579, filed Mar. 4, 2020; Notice of Allowance mailed Jun. 7, 2021; pp. 1-12.
U.S. Appl. No. 29/726,581, filed Mar. 4, 2020; Notice of Allowance mailed Jun. 7, 2021; pp. 1-12.
U.S. Appl. No. 29/726,585, filed Mar. 4, 2020; Notice of Allowance mailed Jun. 15, 2021; pp. 1-14.
U.S. Appl. No. 29/726,586, filed Mar. 4, 2020; Notice of Allowance mailed Jun. 16, 2021; pp. 1-14.
U.S. Appl. No. 29/726,590, filed Mar. 4, 2020; Notice of Allowance mailed Jun. 16, 2021; pp. 1-14.
"Grain Silo" May 15, 2017, posted at thenounproject.com, [site visited Mar. 21, 2022]. https://thenounproject.com/icon/grain-silo-1060685 (Year: 2017); pp. 1-2.
"Granary Icon, Grain Storehouse Vector Art Illustration" Feb. 11, 2019, posted at shutterstock.com, [site visited Mar. 18, 2022]. https://www.shutterstock.com/image-vector/granary-icon-grain-storehouse-vector-art-1243969090 (Year: 2019); pp. 1-2.
"Icecream Bar Colored Line Vector Icon" Apr. 27, 2018, posted at shutterstock.com, [site visited Mar. 18, 2022]. https://www.shutterstock.com/image-vector/icecream-bar-colored-line-vector-icon-471876635 (Year: 2018); pp. 1-2.
"Vector Illustration Eps1O" Jan. 27, 2019, posted at shutterstock.com, [site visited Mar. 21, 2022]. https://www.shutterstock.com/image-vector/vector-illustration-eps10-1220132866 (Year: 2019); pp. 1-2.
European Examination Report for Application No. 20754561.7, Issued Jul. 9, 2024, 7 Pages.

\* cited by examiner

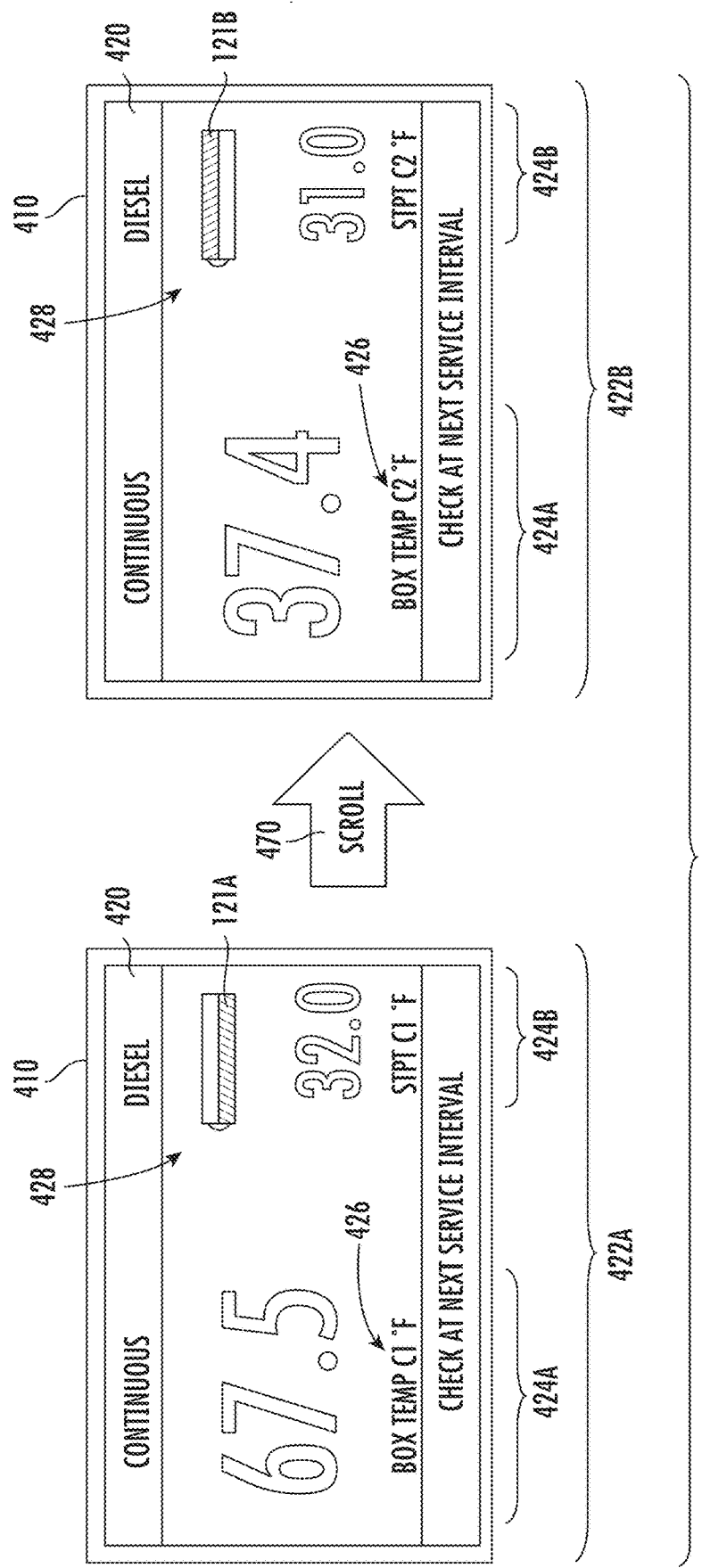

TRAILER COMPARTMENT TRANSPORTATION REFRIGERATION UNIT OPERATION VISUALIZATION

CROSS REFERENCE TO RELATED APPLICATIONS

This application claims the benefit of U.S. Application No. 62/880,365, filed on Jul. 30, 2019 and U.S. Application No. 62/882,739, filed Aug. 5, 2020, which is incorporated herein by reference in its entirety.

BACKGROUND

The embodiments herein generally relate to transport refrigeration systems and more specifically, the monitoring the refrigerated cargo space of refrigerated transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an alternating (AC) synchronous generator that generates AC power. The generated AC power is used to power an electric motor for driving the refrigerant compressor of the transportation refrigeration unit and also powering electric AC fan motors for driving the condenser and evaporator motors and electric heaters associated with the evaporator. A more efficient method to power the electric motor is desired to reduce fuel usage.

BRIEF DESCRIPTION

According to one embodiment, a transport refrigeration system is provided. The transport refrigeration system including a refrigerated cargo space subdivided into one or more compartments including a first compartment; a transportation refrigeration unit configured to provide conditioned air to each of the one or more compartments; and a display configured to generate a graphical user interface comprising one or more graphical user interface sections, wherein the one or more graphical user interface sections comprise a first graphical user interface section associated with the first compartment, wherein the first graphical user interface section displays operating parameters for the first compartment, and wherein the first graphical user interface section displays a compartment icon illustrating a current compartment layout of the one or more compartments and identifies the first compartment.

In addition to one or more of the features described above, or as an alternative, further embodiments of the transport refrigeration system may include that the one or more compartments further includes a second compartment, wherein the one or more graphical user interface sections further includes a second graphical user interface section associated with the second compartment, wherein the second graphical user interface section displays operating parameters for the second compartment.

In addition to one or more of the features described above, or as an alternative, further embodiments of the transport refrigeration system may include that the second graphical user interface section displays a compartment icon illustrating a current compartment layout of the one or more compartments and identifies the second compartment.

In addition to one or more of the features described above, or as an alternative, further embodiments of the transport refrigeration system may include that the operating parameter include at least one of a temperature within the first compartment and a set point for the first compartment.

In addition to one or more of the features described above, or as an alternative, further embodiments of the transport refrigeration system may include that the first compartment is identified by the first graphical user interface by shading the first compartment within the current compartment layout of the graphical user interface.

In addition to one or more of the features described above, or as an alternative, further embodiments of the transport refrigeration system may include that the second graphical user interface section is displayed simultaneously with the first graphical user interface section.

In addition to one or more of the features described above, or as an alternative, further embodiments of the transport refrigeration system may include that graphical user interface scrolls between the first graphical user interface section and the second graphical user interface section.

According to another embodiment, a method of monitoring operating parameters of a refrigerated cargo space within a transport refrigeration system is provided. The method including: obtaining a compartment layout of the refrigerated cargo space, the refrigerated cargo space being subdivided into one or more compartments including a first compartment; detecting operating parameters of the first compartment; generating a graphical user interface on a display device, the graphical user interface comprising one or more graphical user interface sections, wherein the one or more graphical user interface sections comprises a first graphical user interface section associated with the first compartment; displaying the operating parameter of the first compartment via graphical user interface within the first graphical user interface section; and displaying a compartment icon within the first graphical user interface section, the compartment icon illustrating a current compartment layout of the one or more compartments and identifying the first compartment.

In addition to one or more of the features described above, or as an alternative, further embodiments of the method may include: providing conditioned air to at least one of the one or more compartments.

In addition to one or more of the features described above, or as an alternative, further embodiments of the method may include: providing conditioned air to the one or more compartments.

In addition to one or more of the features described above, or as an alternative, further embodiments of the method may include that the one or more compartments further includes a second compartment, wherein the one or more graphical user interface sections further includes a second graphical user interface section associated with the second compartment, and wherein the method further includes: displaying the operating parameter of the second compartment via graphical user interface within the second graphical user interface section.

In addition to one or more of the features described above, or as an alternative, further embodiments of the method may include displaying a second compartment icon within the second graphical user interface section, the compartment icon illustrating a current compartment layout of the one or more compartments and identifying the second compartment.

In addition to one or more of the features described above, or as an alternative, further embodiments of the method may include that the operating parameter include at least one of a temperature within the first compartment and a set point for the first compartment.

In addition to one or more of the features described above, or as an alternative, further embodiments of the method may include that the first compartment is identified by the first graphical user interface by shading the first compartment within the current compartment layout of the graphical user interface.

In addition to one or more of the features described above, or as an alternative, further embodiments of the method may include displaying the second graphical user interface section simultaneously with the first graphical user interface section.

In addition to one or more of the features described above, or as an alternative, further embodiments of the method may include displaying the second graphical user interface section and the first graphical user interface section separately, wherein graphical user interface scrolls between the first graphical user interface section and the second graphical user interface section.

According to another embodiment, a computer program product embodied on a non-transitory computer readable medium is provided. The computer program product including instructions that, when executed by a processor, cause the processor to perform operations including: obtaining a compartment layout of the refrigerated cargo space, the refrigerated cargo space being sub-divided into one or more compartments including a first compartment; detecting operating parameters of the first compartment; generating a graphical user interface on a display device, the graphical user interface being sub-divided into one or more graphical user interface sections, wherein the one or more graphical user interface sections includes a first graphical user interface section associated with the first compartment; displaying the operating parameter of the first compartment via graphical user interface within the first graphical user interface section; and displaying a compartment icon within the first graphical user interface section, the compartment icon illustrating a current compartment layout of the one or more compartments and identifying the first compartment.

In addition to one or more of the features described above, or as an alternative, further embodiments of the computer program product may include that the operations further include: providing conditioned air to at least one of the one or more compartments.

In addition to one or more of the features described above, or as an alternative, further embodiments of the computer program product may include that the operations further include: providing conditioned air to the one or more compartments.

In addition to one or more of the features described above, or as an alternative, further embodiments of the computer program product may include that the one or more compartments further includes a second compartment, wherein the one or more graphical user interface sections further includes a second graphical user interface section associated with the second compartment, and wherein the operations further include: displaying the operating parameter of the second compartment via graphical user interface within the second graphical user interface section.

Technical effects of embodiments of the present disclosure include displaying operating parameters for each compartment of a refrigerated cargo space.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 5A is a schematic illustration of display generating a graphical user interface showing operational parameters for the compartment layout of FIG. 3A, according to an embodiment of the present disclosure;

DETAILED DESCRIPTION

A detailed description of one or more embodiments of the disclosed apparatus and method are presented herein by way of exemplification and not limitation with reference to the Figures.

Figure 1:
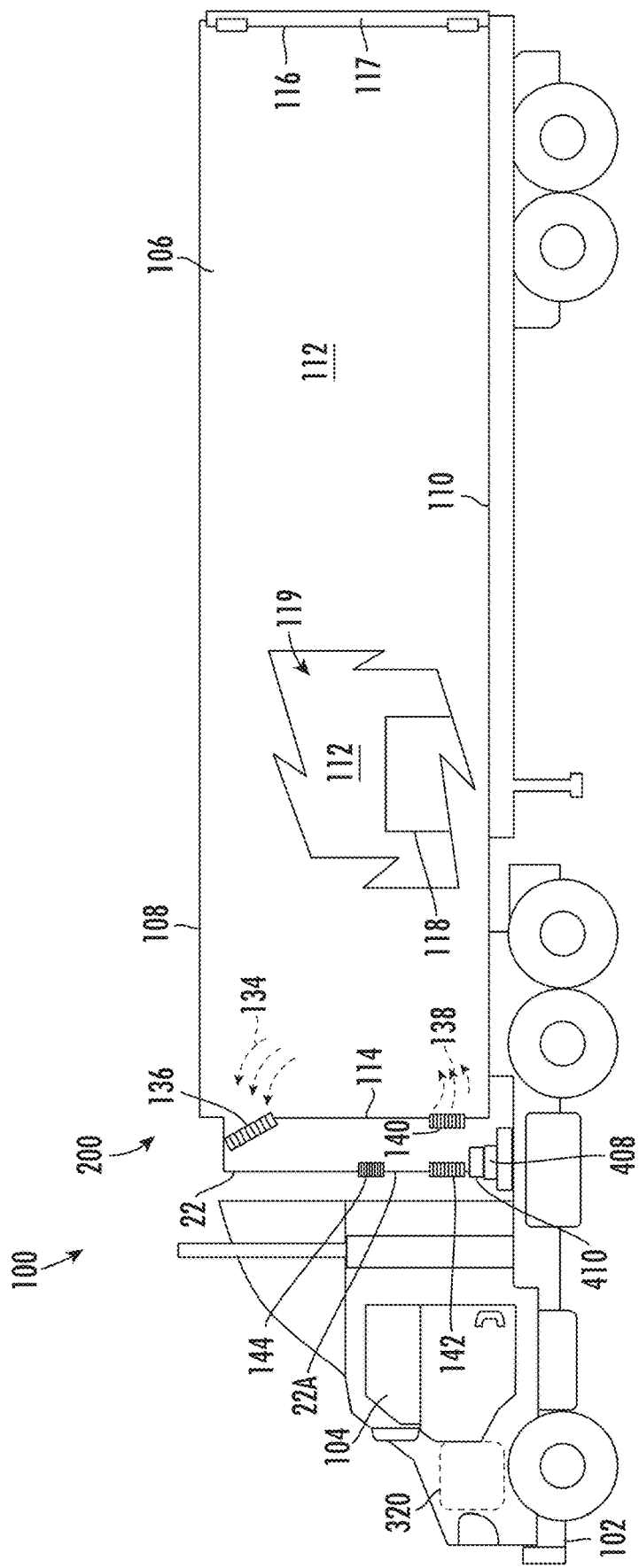
FIG. 1 is a schematic illustration of a transport refrigeration system, according to an embodiment of the present disclosure.
Figure 2:
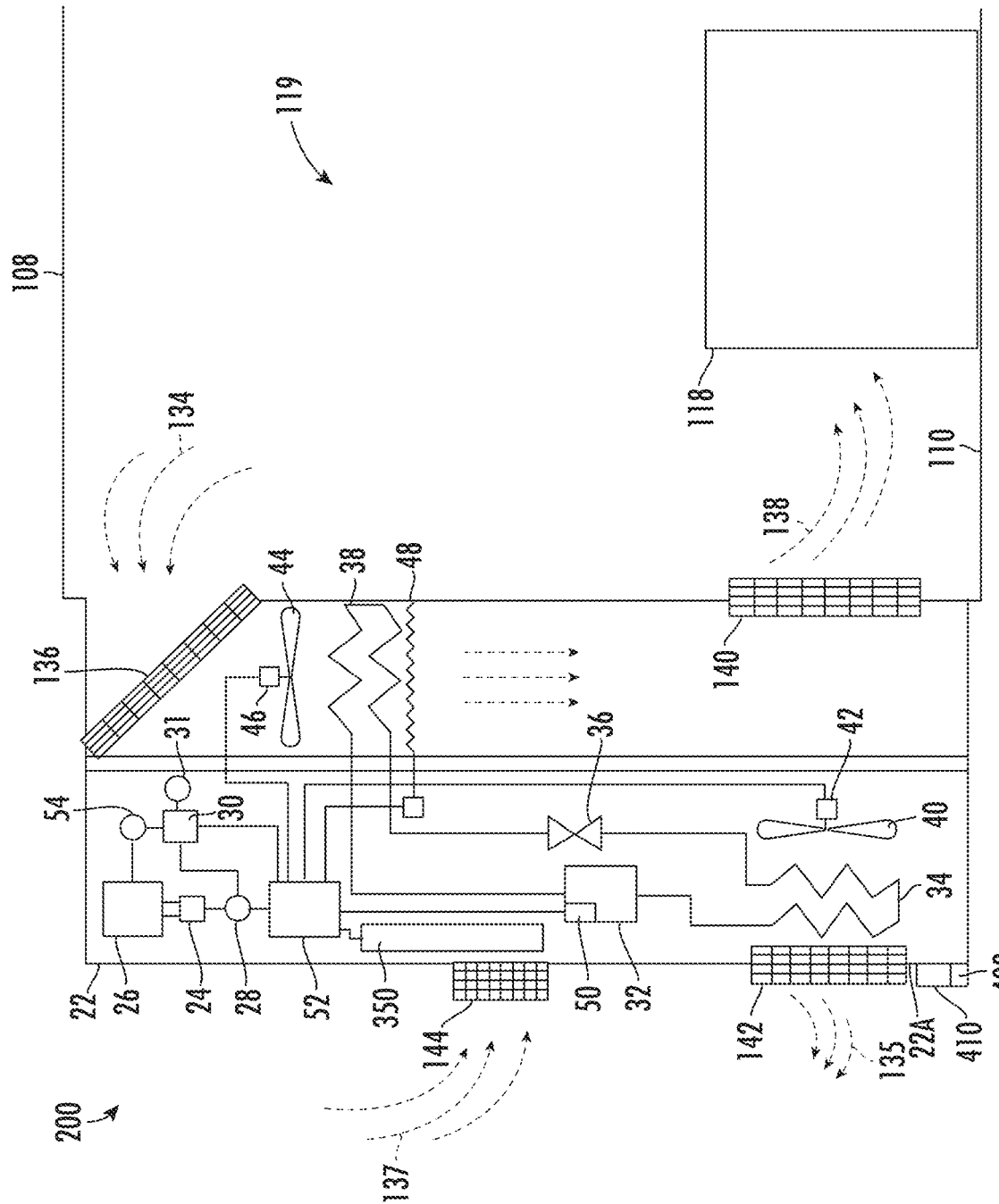
FIG. 2 is an enlarged schematic illustration of a transportation refrigeration unit of the transport refrigeration system of FIG. 1, according to an embodiment of the present disclosure.

Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a truck or trailer system 100, as seen in FIG. 1. The trailer system 100 includes a vehicle 102 integrally connected to a transport container 106. The vehicle 102 includes an operator's compartment or cab 104 and a propulsion motor 320 which acts as the drive system of the truck or trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be a combustion engine, an electric motor, or a hybrid motor (e.g., a combination of a combustion engine and an electric motor). The transport container 106 of FIG. 1 is removably coupled to the vehicle 102. The transport container 106 is may also be permanently coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. The refrigerated cargo space 119 may be subdivided into multiple different compartments that each have a different controlled environment (e.g., different temperature). It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a refrigeration unit 22, an electric generation device 24, a prime mover 26 for driving the electric generation device 24, and a controller 30. The transportation refrigeration unit 22 is in operative association with the refrigerated cargo space 119 and is configured to provide conditioned air to the transport container 106. The transportation refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in one or more compartments of the refrigerated cargo space 119, as known to one of ordinary skill in the art. In an embodiment, the transportation refrigeration unit 22 is capable of providing a desired temperature and humidity range.

The transportation refrigeration unit 22 includes a refrigerant compression device 32, a refrigerant heat rejection heat exchanger 34 (e.g., condenser), an expansion device 36, and a refrigerant heat absorption heat exchanger 38 (e.g., evaporator) connected in refrigerant flow communication in a closed loop refrigerant circuit and arranged in a conventional refrigeration cycle. The transportation refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transportation refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transportation refrigeration unit 22 is operating in a subcritical refrigerant cycle or as a refrigerant gas cooler, such as if the transportation refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transportation refrigeration unit 22. A return airflow 134 flows into the transportation refrigeration unit 22 from the refrigerated cargo space 119 through the return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transportation refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transportation refrigeration unit 22 can further be operated in reverse to warm the container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transportation refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the prime mover 26, typically through an electronic engine controller 54 operatively associated with the prime mover 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The controller 30 is in electronic communication with a display 410, configured to display operational parameters of the transportation refrigeration unit 22. The controller 30 may be connected to the display 410 via a hardwire and/or wireless connection. The display 410 may be attached to transportation refrigeration unit 22. For example, the display 410 may be attached to an outer housing 22A, as illustrated in FIGS. 1 and 2, such that an employee loading the refrigerated cargo space 119 may view the display 410. Alternatively, the display 410 may not be attached to the transportation refrigeration unit 22 and may be wirelessly connected to the controller 34 through a communication module 31. For example, the display 410 may be a display of a smart phone, laptop, smart watch, computer tablet, desktop computer, vehicle instrument cluster, vehicle dashboard, or other computing device known to one of skill in the art. The communication module 31 may communicate wirelessly via a long-range communication protocol or short-range communication protocol. Long-range communication protocol may include, but is not limited to, cellular, satellite, LTE (NB-IoT, CAT M1), LoRa, Satellite, Ingenu, SigFox, or other long-range wireless protocol known to one of skill in the art. Short-range communication protocol may include, but is not limited to, Bluetooth, Wi-Fi, HaLow (801.11 ah), Wireless M-Bus, zWave, ZigBee, or other short-range wireless protocol known to one of skill in the art.

The controller 30 is in also electronic communication with an input device 408 associated with the display device, configured to allow entry of user input. The input device 408 may also be in electronic communication with the display 410. The controller 30 may be connected to the input device 408 via a hardwire and/or wireless connection. The input device 408 may be attached to transportation refrigeration unit 22. For example, the input device 408 may be attached to an outer housing 22A, as illustrated in FIGS. 1 and 2, such that an employee loading the refrigerated cargo space 119 may enter user input via the input device 408. Alternatively, the input device 408 may not be attached to the transportation refrigeration unit 22 and may be wirelessly connected to the controller 34 through a communication module 31. For example, the input device 408 may be a data input device of a computing device, such as, for example, a keyboard, mouse, keypad, touchscreen, scroll wheel, scroll ball, microphone, or any other data input device known to one of skill in the art. The computer device may be a smart phone, laptop, smart watch, computer tablet, desktop computer, vehicle instrument cluster, vehicle dashboard, or other computing device known to one of skill in the art.

The prime mover 26, which may comprise an on-board fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Alternatively, the in an all-electric unit, the prime mover 26 may be replaced and/or supplemented by an energy storage device 350 that powers the compression device drive motor 50. The energy storage device 350 may store and provide electrical energy to power the compression device drive motor 50 and various other power demands of the transportation refrigeration unit 22. The electric generation device 24 may also be used to charge the energy storage device 350. The transportation refrigeration unit 22 may be powered by the energy storage device 350, which provides electrical energy to the transportation refrigeration unit 22 and will be discussed further below. Examples of the energy storage device 350 may include a battery system (e.g., a battery or bank of batteries), fuel cells, flow battery, and others devices capable of storing and outputting electric energy that may be direct current (DC). The energy storage device 350 may include a battery system, which may employ multiple batteries organized into battery banks. In one embodiment, the energy storage device 350 may provide electrical energy to the transportation refrigeration unit 22 and the propulsion motor 320 of the vehicle 102. In another embodiment, the energy storage device 350 may provide electrical energy solely to the transportation refrigeration unit 22, while the propulsion motor 320 of the vehicle 102 receives electrical energy from another source. In one embodiment, the energy storage device 350 is located within of the transportation refrigeration unit 22, as shown in FIG. 1. In another embodiment, the energy storage device 350 is located outside the transportation refrigeration unit 22.

The energy storage device 350 may be charged by a stationary charging station such as, for example a wall 48V power outlet. The charging station may provide single phase (e.g., level 2 charging capability) or three phase alternating current (AC) energy to the energy storage device 350. It is understood that the charging station 386 may have any phase charging and embodiments disclosed herein are not limited to single phase or three phase AC power. In an embodiment, the single phase AC power may be a high voltage DC power, such as, for example, between 48 to 900 VDC.

The transportation refrigeration unit 22 has a plurality of electrical power demand loads, that may include but are not limited to, the display 400, the input device 408, the compression device drive motor 50 for the refrigerant compression device 32, the fan motor 42 for the fan 40 associated with the refrigerant heat rejection heat exchanger 34, and the fan motor 46 for the fan 44 associated with the refrigerant heat absorption heat exchanger 38. It is to be understood that, while not required, various power converters 52, such as, for example, AC to DC rectifiers, DC to AC inverters, AC to AC voltage/frequency converters, and DC to DC voltage converters, may be employed in connection with the energy storage device 150 as appropriate. In an embodiment, each of the fan motors 42, 46 and the compression device drive motor 50 may be an AC motor and are thus electrically connected to the energy storage device 350 through a DC-to-AC variable invertor within the power converter 52 that is configured to convert the DC electrical energy from the energy storage device to AC electrical energy in a variable continuous energy output to power the transportation refrigeration unit 22.

In the depicted embodiment, the heater 48 also constitutes an electrical power demand load. The heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136. Additionally, the compression device drive motor 50 being used to power the refrigerant compression device 32 may also constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage from the energy storage device 350.

Referring now to FIG. 3A, 3B, 3C, 3D with continued reference to FIGS. 1 and 2, various arrangements of compartments 121A, 121B, 121C of the refrigerated cargo space 119 are illustrated in accordance with an embodiment of the present disclosure. The refrigerated cargo space 119 may be subdivided into one or more compartments 121A-121C that each have a different controlled environment (e.g., different temperature). The refrigerated cargo space 119 may be subdivided into one or more compartments 121A-121C by one or more dividing walls 23A, 23B. The transportation refrigeration unit 22 is fluidly connected to each compartment 121A-121C. The transportation refrigeration unit 22 is configured to provide supply airflow 138 to each compartment 121A-121C. It is understood that the compartments illustrated in FIGS. 3A-3D are a few of many possible configurations of compartments, and the embodiments described herein may be applicable to a refrigerated cargo space 119 having any number of compartments in any configurations.

A temperature sensor 450 may be located in each of the compartments 121A-121C. The temperatures sensor 450 may be in communication with the controller 30. The temperature sensor 450 is configured to detect operating parameters with the compartment 121A-121C, such as, for example the current temperature within the compartment 121A-121C. The temperature sensor 450 is configured to transmit the operating parameters detected to the controller 30.

Figure 3A:
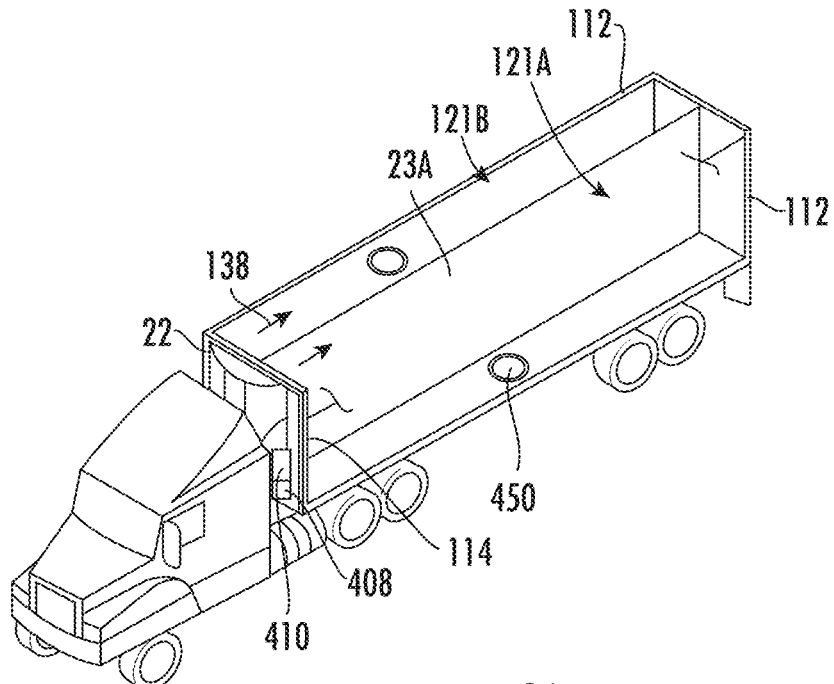
FIG. 3A is a schematic illustration of a compartment layout within a refrigerated cargo space of the transport refrigeration system of FIG. 1, according to an embodiment of the present disclosure.

FIG. 3A illustrates a refrigerated cargo space 119 that is subdivided into a first compartment 121A and a second compartment 121B. The first compartment 121A may be a left compartment, as illustrated in FIG. 3A. The second compartment 121B may be a right compartment, as illustrated in FIG. 3A. The first compartment 121A and the second compartment 121B are separated by a first dividing wall 23A that physically divides the refrigerated cargo space 119 into the first compartment 121A and the second compartment 121B. The first dividing wall 23A extends from the front wall 114 to the rear wall 116.

Figure 3B:
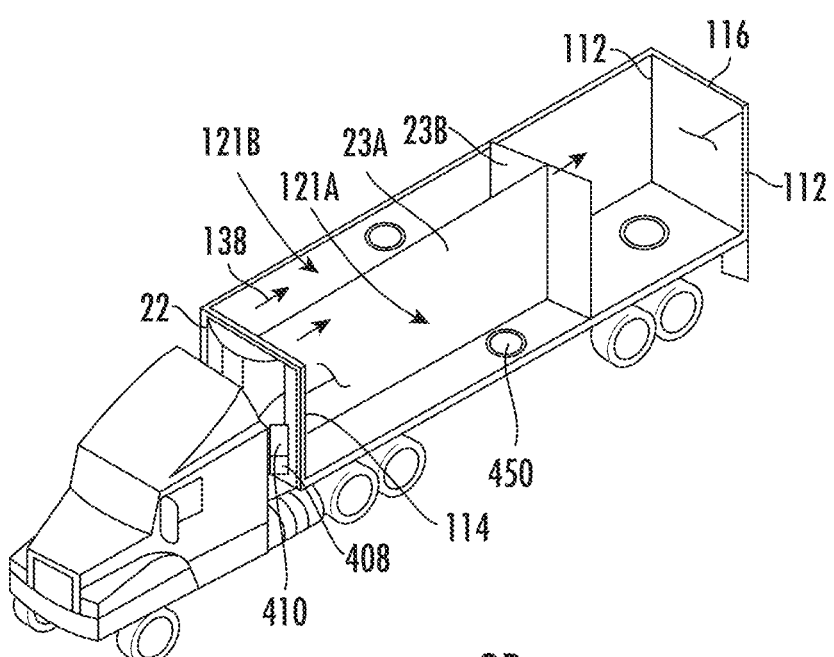
FIG. 3B is a schematic illustration of a compartment layout within a refrigerated cargo space of the transport refrigeration system of FIG. 1, according to an embodiment of the present disclosure.

FIG. 3B illustrates a refrigerated cargo space 119 that is subdivided into a first compartment 121A, a second compartment 121B and a third compartment 121C. The first compartment 121A may be a left compartment, as illustrated in FIG. 3B. The second compartment 121B may be a right compartment, as illustrated in FIG. 3B. The third compartment 121C may be a rear or aft compartment, as illustrated in FIG. 3B. The first compartment 121A and the second compartment 121B are separated by a first dividing wall 23A that physically divides the refrigerated cargo space 119 into the first compartment 121A and the second compartment 121B up until the second dividing wall 23B. The first dividing wall 23A extends from the front wall 114 to the second dividing wall 23B. The second dividing wall 23B extends between the opposing side walls 112. The second dividing wall 23B separates the third compartment 123C from the first compartment 121A and the second compartment 121B.

Figure 3C:
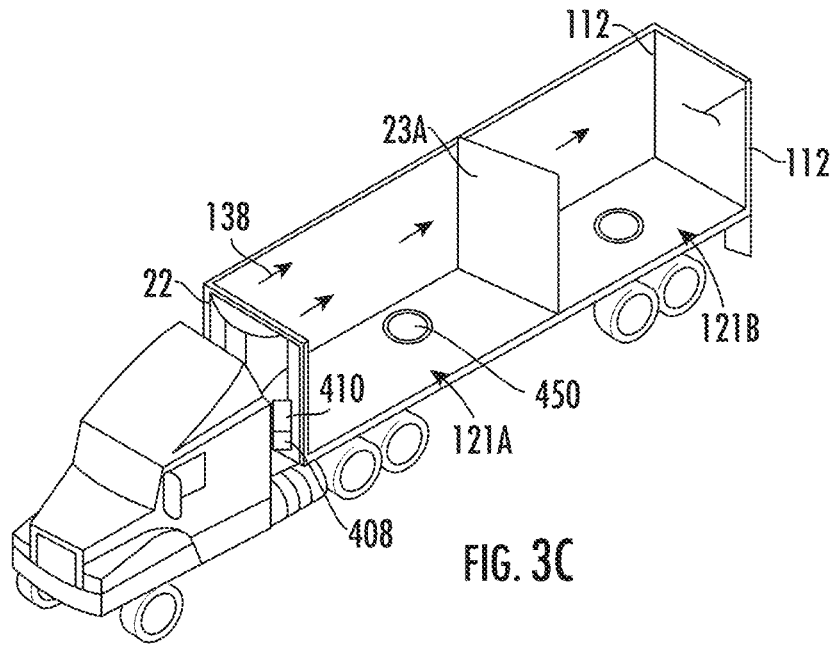
FIG. 3C is a schematic illustration of a compartment layout within a refrigerated cargo space of the transport refrigeration system of FIG. 1, according to an embodiment of the present disclosure.

FIG. 3C illustrates a refrigerated cargo space 119 that is subdivided into a first compartment 121A and a second compartment 121B. The first compartment 121A may be a forward compartment, as illustrated in FIG. 3C. The second compartment 121B may be a rear compartment, as illustrated in FIG. 3C. The first compartment 121A and the second compartment 121B are separated by a first dividing wall 23A that physically divides the refrigerated cargo space 119 into the first compartment 121A and the second compartment 121B. The first dividing wall 23A extends between the opposing side walls 112.

Figure 3D:
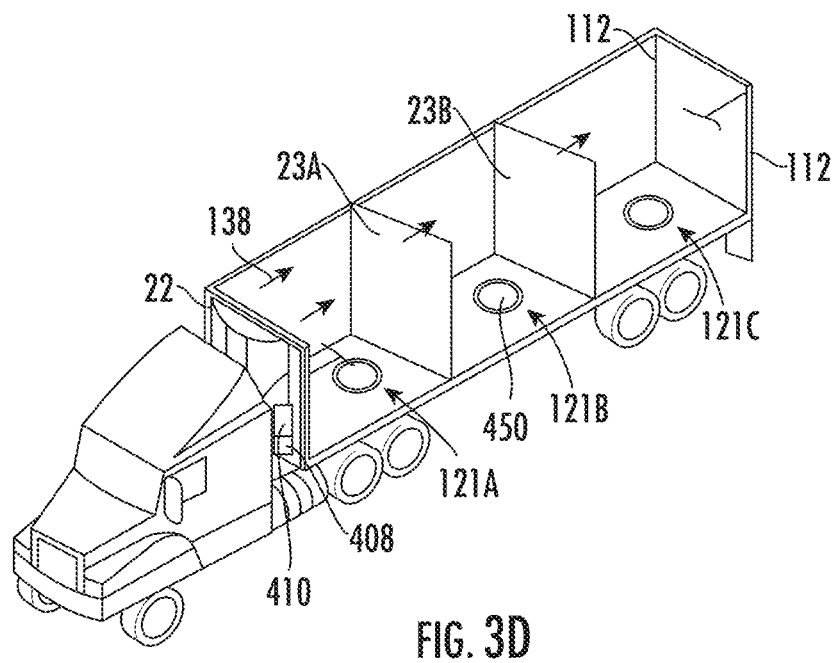
FIG. 3D is a schematic illustration of a compartment layout within a refrigerated cargo space of the transport refrigeration system of FIG. 1, according to an embodiment of the present disclosure.

FIG. 3D illustrates a refrigerated cargo space 119 that is subdivided into a first compartment 121A, a second compartment 121B, and a third compartment 121C. The first compartment 121A may be a forward compartment, as illustrated in FIG. 3D. The second compartment 121B may be a middle compartment, as illustrated in FIG. 3D. The third compartment 121C may be a rear or aft compartment, as illustrated in FIG. 3D. The first compartment 121A and the second compartment 121B are separated by a first dividing wall 23A that physically divides the refrigerated cargo space 119 into the first compartment 121A and the second compartment 121B. The first dividing wall 23A extends between the opposing side walls 112. The second compartment 121B and the third compartment 121C are separated by a second dividing wall 23B that physically divides the refrigerated cargo space 119 into the second compartment 121B and the third compartment 121C. The second dividing wall 23B extends between the opposing side walls 112.

The compartment layout of compartments 121A, 121B, 121C of the refrigerated cargo space 119 may be obtained via automatic detection by the controller 30 and/or a user input entered manually by a user via the input device 408. The user input may identify the number of compartments 121A, 121B, 121C and arrangement. The number and arrangement of the compartments 121A, 121B, 121C may also be displayed via the display 410 along with operating parameters within each compartment 121A, 121B, 121C. Operating parameters may include, but are not limited to, the temperature set point for the compartment 121A, 121B, 121C and a current temperature within each compartment 121A, 121B, 121C.

Referring now to FIGS. 4A, 4B, 4C, 4D, 5A, 5B, 5C, and 5D, with continued reference to FIGS. 1-3, a graphical user interface (GUI) 412 of the display 410 is illustrated, in accordance with an embodiment of the present disclosure. The GUI 420 displays operating parameters for each of the compartments 121A, 121B, 121C. In one embodiment, each GUI sections 422A, 422B, 422C may be displayed simultaneously within the GUI 420 on the display 410, as illustrated in FIGS. 4A-4D, thus each GUI sections 422A, 422B, 422C only occupies a portion of the entire GUI 420. In another embodiment, each GUI section 422A, 422B, 422C may be displayed separately within the GUI 420 on the display 410 and the GUI 420 may scroll 470 between each GUI section 422A, 422B, 422C, as illustrated in FIGS. 5A-5D, thus each GUI sections 422A, 422B, 422C occupies the entire GUI 420.

The GUI section 422A, 422B, 422C each display the operating parameters 424A, 424B for the respective compartment. In an embodiment, a first operating parameter 424A may be the current temperature within the compartment 121A, 121B, 121C (i.e., Box Temp). In an embodiment, a second operating parameter 424B may be the temperature set point for the compartment 121A, 121B, 121C.

Figure 4A:
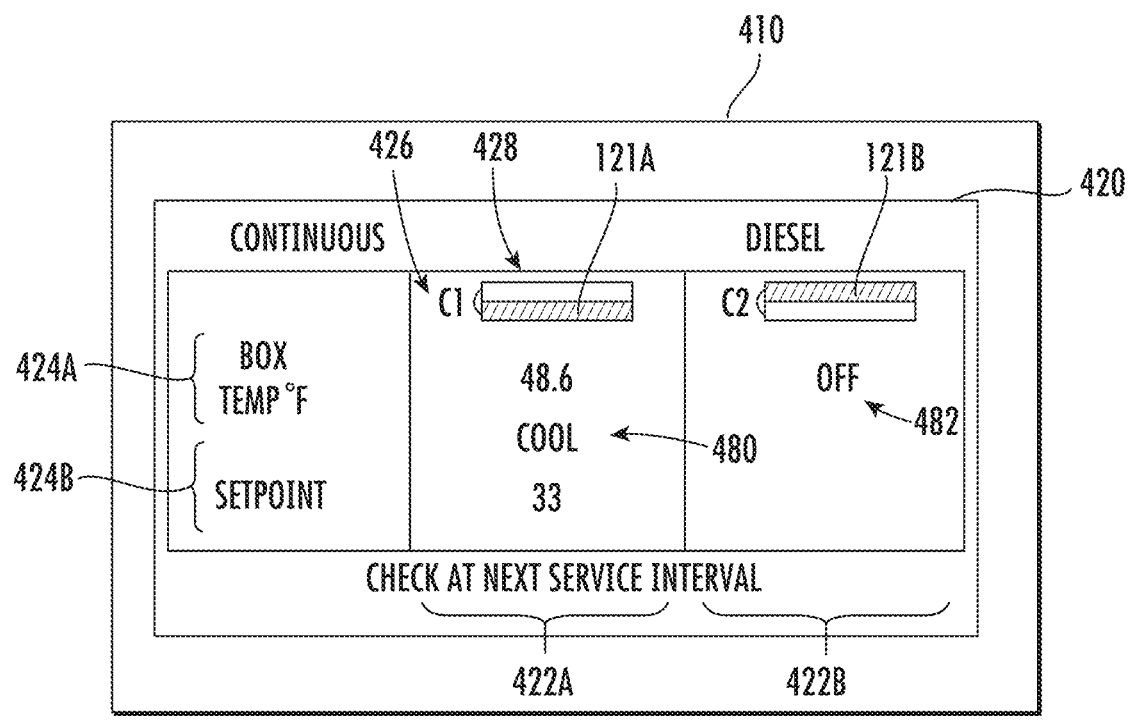
FIG. 4A is a schematic illustration of display generating a graphical user interface showing operational parameters for the compartment layout of FIG. 3A, according to an embodiment of the present disclosure.
Figure 4B:
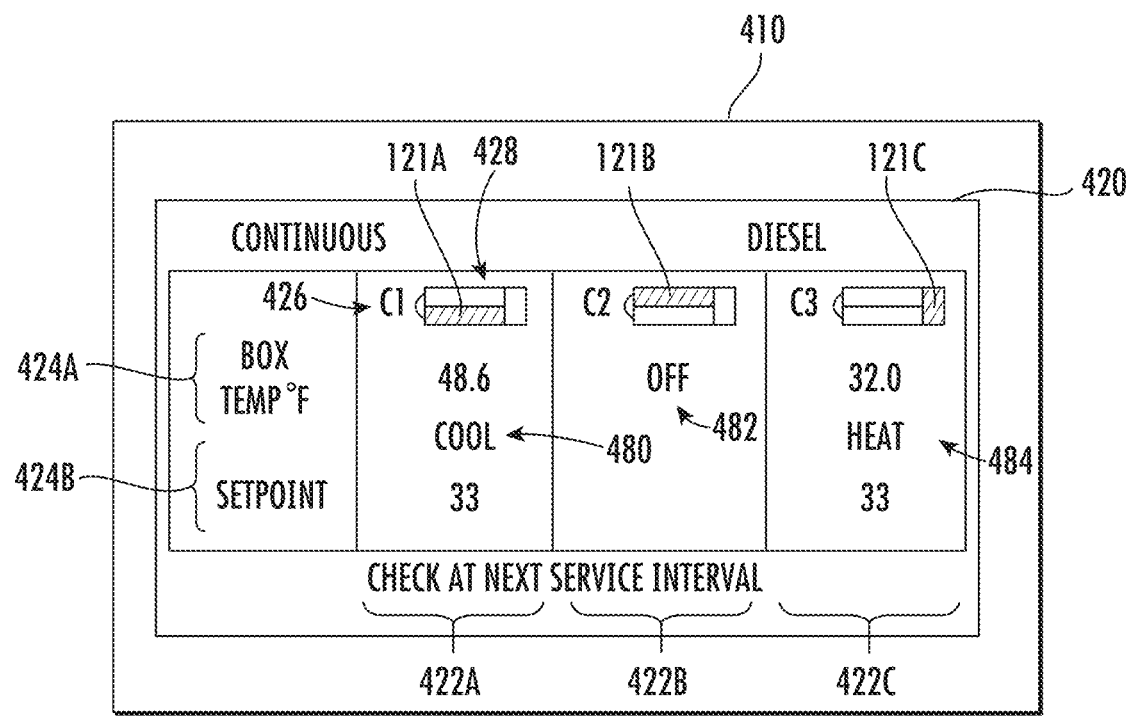
FIG. 4B is a schematic illustration of display generating a graphical user interface showing operational parameters for the compartment layout of FIG. 3B, according to an embodiment of the present disclosure.

Each of the GUI sections 422A, 422B, 422C displays a compartment nomenclature 426 identifying a name of the compartment 121A, 121B, 121C associated with the GUI section 422A, 422B, 422C. Each of the GUI sections 422A, 422B, 422C may display an operation status of the transportation refrigeration unit 22 for the compartment 121A, 121B, 121C associated with the GUI section 422A, 422B, 422C. For example, the operation status may include cooling, heating, or off. If the transportation refrigeration unit 22 is currently cooling the compartment 121A, 121B, 121C associated with the GUI section 422A, 422B, 422C, then the GUI section 422A, 422B, 422C may display a cooling icon 480, such as, for example, the text "COOL", as illustrated in FIGS. 4A and 4B. If the transportation refrigeration unit 22 is currently heating the compartment 121A, 121B, 121C associated with the GUI section 422A, 422B, 422C, then the GUI section 422A, 422B, 422C may display a heating icon 484, such as, for example, the text "HEAT", as illustrated in FIG. 4B. If the transportation refrigeration unit 22 is off for the compartment 121A, 121B, 121C associated with the GUI section 422A, 422B, 422C, then the GUI section 422A, 422B, 422C may display an off icon 482, such as, for example, the text "OFF", as illustrated in FIGS. 4A and 4B. Operating parameters 424A, 424B may not be displayed in a GUI section 422A, 422B, 422C where the transportation refrigeration unit 22 is indicated as being "OFF", as shown in FIGS. 4A and 4B.

Each of the GUI sections 422A, 422B, 422C also displays depicting a compartment icon 428 illustrating a current compartment layout within the refrigerated compartment 119 and identifies the specific compartment 121A, 121B, 121C associated with the respective GUI sections 422A, 422B, 422C. The compartment icon 428 may identify the specific compartment 121A, 121B, 121C associated with the respective GUI sections 422A, 422B, 422C by shading in the specific compartment 121A, 121B, 121C associated with the respective GUI sections 422A, 422B, 422C within the compartment icon 428, as illustrated in FIGS. 4A-4D and 5A-5D. FIGS. 4A-4D illustrate the GUI 420 displaying all of the GUI sections 422A, 422B, 422C simultaneously, whereas FIGS. 5A-5D illustrate the GUI 420 displaying the GUI sections 422A, 422B, 422C separately and scrolling 470 between GUI sections 422A, 422B, 422C.

FIG. 4A illustrates a GUI 420 for the refrigerated cargo space 119 of FIG. 3A that is subdivided into a first compartment 121A and a second compartment 121B. The GUI 420 of FIG. 4A is subdivided into a first GUI section 422A associated with the first compartment 121A of FIG. 3A and a second GUI section 422B associated with the second compartment 121B of FIG. 3A.

The first GUI section 422A of FIG. 4A is configured to display operating parameters 424A, 424B of the first compartment 121A of FIG. 3A. The first GUI section 422A of FIG. 4A displays a compartment nomenclature 426 identifying the first compartment 121A of FIG. 3A as "C1". The compartment icon 428 of the first GUI section 422A of FIG. 4A illustrates both the first compartment 121A and the second compartment 121B of FIG. 3A. The compartment icon 428 of the first GUI section 422A of FIG. 4A identifies the first compartment 121A of FIG. 3A as associated with the first GUI section 422A using shading.

The second GUI section 422B of FIG. 4A is configured to display operating parameters 424A, 424B of the second compartment 121B of FIG. 3A. The second GUI section 422B of FIG. 4A displays a compartment nomenclature 426 identifying the second compartment 121B of FIG. 3A as "C2". The compartment icon 428 of the second GUI section 422B of FIG. 4A illustrates both the first compartment 121A and the second compartment 121B of FIG. 3A. The compartment icon 428 of the second GUI section 422B of FIG. 4A identifies the second compartment 121B of FIG. 3A as associated with the second GUI section 422B using shading.

FIG. 4B illustrates a GUI 420 for the refrigerated cargo space 119 of FIG. 3B that is subdivided into a first compartment 121A, a second compartment 121B, and a third compartment 121C. The GUI 420 of FIG. 4B is subdivided into a first GUI section 422A associated with the first compartment 121A of FIG. 3B, a second GUI section 422B associated with the second compartment 121B of FIG. 3B, and a third GUI section 422C associated with the third compartment 121C of FIG. 3B.

The first GUI section 422A of FIG. 4B is configured to display operating parameters 424A, 424B of the first compartment 121A of FIG. 3B. The first GUI section 422A of FIG. 4B displays a compartment nomenclature 426 identifying the first compartment 121A of FIG. 3B as "C1". The compartment icon 428 of the first GUI section 422A of FIG. 4B illustrates both the first compartment 121A and the second compartment 121B of FIG. 3B. The compartment icon 428 of the first GUI section 422A of FIG. 4B identifies the first compartment 121A of FIG. 3B as associated with the first GUI section 422A using shading.

The second GUI section 422B of FIG. 4B is configured to display operating parameters 424B, 424B of the second compartment 121B of FIG. 3B. The second GUI section 422B of FIG. 4B displays a compartment nomenclature 426 identifying the second compartment 121B of FIG. 3B as "C2". The compartment icon 428 of the second GUI section 422B of FIG. 4B illustrates both the first compartment 121A and the second compartment 121B of FIG. 3B. The compartment icon 428 of the second GUI section 422B of FIG. 4B identifies the second compartment 121B of FIG. 3B as associated with the second GUI section 422B using shading.

The third GUI section 422C of FIG. 4B is configured to display operating parameters 424B, 424B of the third compartment 121C of FIG. 3B. The third GUI section 422C of FIG. 4B displays a compartment nomenclature 426 identifying the third compartment 121C of FIG. 3B as "C3". The compartment icon 428 of the third GUI section 422C of FIG. 4B illustrates the first compartment 121A, the second compartment 121B, and the third compartment 131C of FIG. 3B. The compartment icon 428 of the third GUI section 422C of FIG. 4B identifies the third compartment 121C of FIG. 3B as associated with the third GUI section 422C using shading.

Figure 4C:
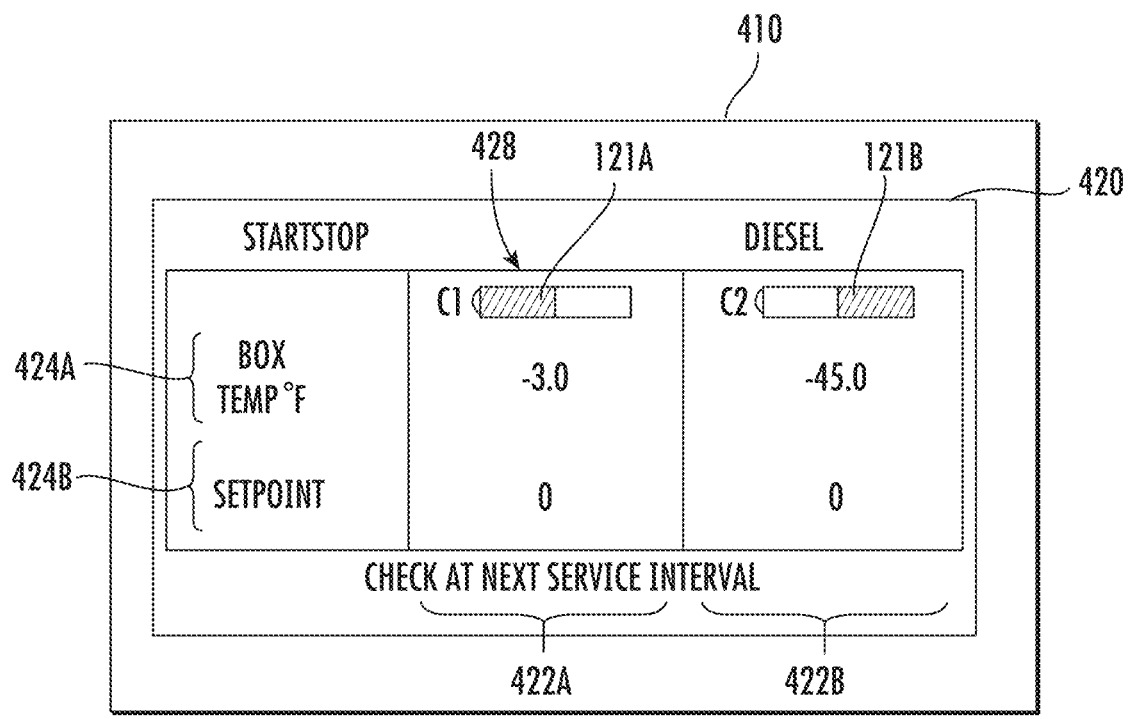
FIG. 4C is a schematic illustration of display generating a graphical user interface showing operational parameters for the compartment layout of FIG. 3C, according to an embodiment of the present disclosure.

FIG. 4C illustrates a GUI 420 for the refrigerated cargo space 119 of FIG. 3C that is subdivided into a first compartment 121A and a second compartment 121B. The GUI 420 of FIG. 4C is subdivided into a first GUI section 422A associated with the first compartment 121A of FIG. 3C and a second GUI section 422B associated with the second compartment 121B of FIG. 3C.

The first GUI section 422A of FIG. 4C is configured to display operating parameters 424A, 424B of the first compartment 121A of FIG. 3C. The first GUI section 422A of FIG. 4C displays a compartment nomenclature 426 identifying the first compartment 121A of FIG. 3C as "C1". The compartment icon 428 of the first GUI section 422A of FIG. 4C illustrates both the first compartment 121A and the second compartment 121B of FIG. 3C. The compartment icon 428 of the first GUI section 422A of FIG. 4C identifies the first compartment 121A of FIG. 3C as associated with the first GUI section 422A using shading.

The second GUI section 422B of FIG. 4C is configured to display operating parameters 424A, 424B of the second compartment 121B of FIG. 3C. The second GUI section 422B of FIG. 4C displays a compartment nomenclature 426 identifying the second compartment 121B of FIG. 3C as "C2". The compartment icon 428 of the second GUI section 422B of FIG. 4C illustrates both the first compartment 121A and the second compartment 121B of FIG. 3C. The compartment icon 428 of the second GUI section 422B of FIG. 4C identifies the second compartment 121B of FIG. 3C as associated with the second GUI section 422B using shading.

Figure 4D:
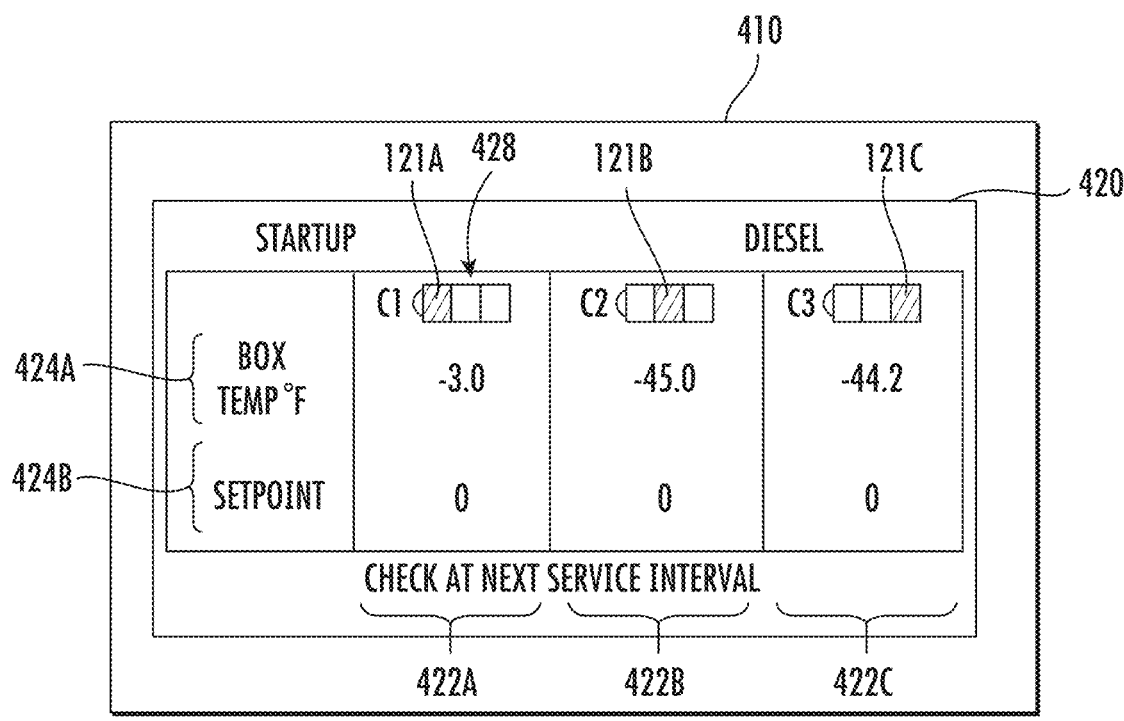
FIG. 4D is a schematic illustration of display generating a graphical user interface showing operational parameters for the compartment layout of FIG. 3D, according to an embodiment of the present disclosure.

FIG. 4D illustrates a GUI 420 for the refrigerated cargo space 119 of FIG. 3D that is subdivided into a first compartment 121A, a second compartment 121B, and a third compartment 121C. The GUI 420 of FIG. 4D is subdivided into a first GUI section 422A associated with the first compartment 121A of FIG. 3D, a second GUI section 422B associated with the second compartment 121B of FIG. 3D, and a third GUI section 422C associated with the third compartment 121C of FIG. 3D.

The first GUI section 422A of FIG. 4D is configured to display operating parameters 424A, 424B of the first compartment 121A of FIG. 3D. The first GUI section 422A of FIG. 4D displays a compartment nomenclature 426 identifying the first compartment 121A of FIG. 3D as "C1". The compartment icon 428 of the first GUI section 422A of FIG. 4D illustrates both the first compartment 121A and the second compartment 121B of FIG. 3D. The compartment icon 428 of the first GUI section 422A of FIG. 4D identifies the first compartment 121A of FIG. 3D as associated with the first GUI section 422A using shading.

The second GUI section 422B of FIG. 4D is configured to display operating parameters 424B, 424B of the second compartment 121B of FIG. 3D. The second GUI section 422B of FIG. 4D displays a compartment nomenclature 426 identifying the second compartment 121B of FIG. 3D as "C2". The compartment icon 428 of the second GUI section 422B of FIG. 4D illustrates both the first compartment 121A and the second compartment 121B of FIG. 3D. The compartment icon 428 of the second GUI section 422B of FIG. 4D identifies the second compartment 121B of FIG. 3D as associated with the second GUI section 422B using shading.

The third GUI section 422C of FIG. 4D is configured to display operating parameters 424B, 424B of the third compartment 121C of FIG. 3D. The third GUI section 422C of FIG. 4D displays a compartment nomenclature 426 identifying the third compartment 121C of FIG. 3D as "C3". The compartment icon 428 of the third GUI section 422C of FIG. 4D illustrates the first compartment 121A, the second compartment 121B, and the third compartment 131C of FIG. 3D. The compartment icon 428 of the third GUI section 422C of FIG. 4D identifies the third compartment 121C of FIG. 3D as associated with the third GUI section 422C using shading.

FIG. 5A illustrates a GUI 420 for the refrigerated cargo space 119 of FIG. 3A that is subdivided into a first compartment 121A and a second compartment 121B. The GUI 420 of FIG. 5A scrolls 470 between the first GUI section 422A associated with the first compartment 121A of FIG. 3A and a second GUI section 422B associated with the second compartment 121B of FIG. 3A. The GUI 420 may scroll 470 between the first GUI section 422A and the second GUI section 422B automatically. For example, the first GUI section 422A may be displayed for a first time period and then the GUI 420 may scroll 470 to display the second GUI section 422B for a second time period before the GUI 420 scrolls 470 to display the first GUI section 422A. The GUI 420 may scroll 470 between the first GUI section 422A and the second GUI section 422B in response to a user input received from the input device 408. For example, a user may scroll between GUI sections 422A, 422B by pressing a button on the input device 408.

The first GUI section 422A of FIG. 5A is configured to display operating parameters 424A, 424B of the first compartment 121A of FIG. 3A. The first GUI section 422A of FIG. 5A displays a compartment nomenclature 426 identifying the first compartment 121A of FIG. 3A as "C1". The compartment icon 428 of the first GUI section 422A of FIG. 5A illustrates both the first compartment 121A and the second compartment 121B of FIG. 3A. The compartment icon 428 of the first GUI section 422A of FIG. 5A identifies the first compartment 121A of FIG. 3A as associated with the first GUI section 422A using shading.

The second GUI section 422B of FIG. 5A is configured to display operating parameters 424A, 424B of the second compartment 121B of FIG. 3A. The second GUI section 422B of FIG. 5A displays a compartment nomenclature 426 identifying the second compartment 121B of FIG. 3A as "C2". The compartment icon 428 of the second GUI section 422B of FIG. 5A illustrates both the first compartment 121A and the second compartment 121B of FIG. 3A. The compartment icon 428 of the second GUI section 422B of FIG. 5A identifies the second compartment 121B of FIG. 3A as associated with the second GUI section 422B using shading.

Figure 5B:
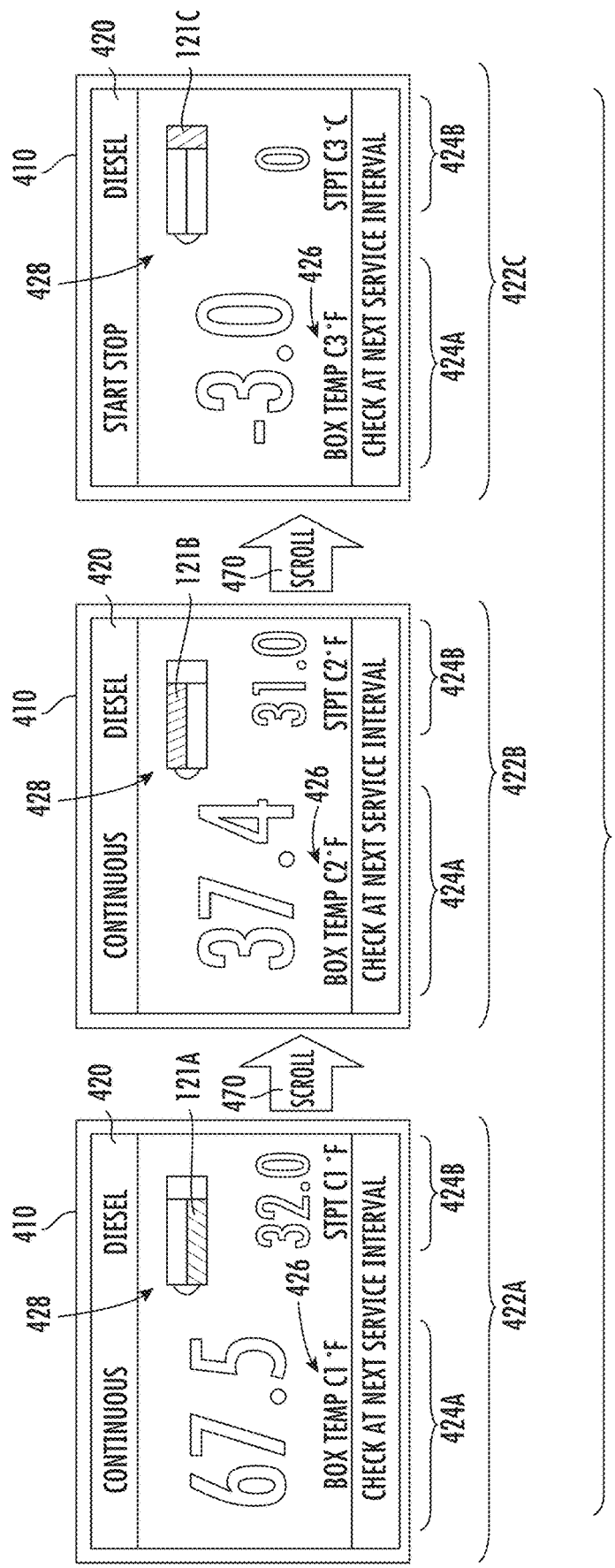
FIG. 5B is a schematic illustration of display generating a graphical user interface showing operational parameters for the compartment layout of FIG. 3B, according to an embodiment of the present disclosure.

FIG. 5B illustrates a GUI 420 for the refrigerated cargo space 119 of FIG. 3B that is subdivided into a first compartment 121A, a second compartment 121B, and a third compartment 121C. The GUI 420 of FIG. 5B scrolls 470 between the first GUI section 422A associated with the first compartment 121A of FIG. 3B, the second GUI section 422B associated with the second compartment 121B of FIG. 3B, and the third GUI section 422C associated with the third compartment 121C of FIG. 3B. The GUI 420 may scroll 470 between the first GUI section 422A, the second GUI section 422B, and the third GUI section 422C automatically. For example, the first GUI section 422A may be displayed for a first time period, then the GUI 420 may scroll 470 to display the second GUI section 422B for a second time period, then the GUI 420 may scroll 470 to display the third GUI section 422C for a third time period before the GUI 420 scrolls 470 to display the first GUI section 422A. The GUI 420 may scroll 470 between the first GUI section 422A, the second GUI section 422B, and the third GUI section 422C in response to a user input received from the input device 408. For example, a user may scroll between GUI sections 422A, 422B, 422C by pressing a button on the input device 408.

The first GUI section 422A of FIG. 5B is configured to display operating parameters 424A, 424B of the first compartment 121A of FIG. 3B. The first GUI section 422A of FIG. 5B displays a compartment nomenclature 426 identifying the first compartment 121A of FIG. 3B as "C1". The compartment icon 428 of the first GUI section 422A of FIG. 5B illustrates both the first compartment 121A and the second compartment 121B of FIG. 3B. The compartment icon 428 of the first GUI section 422A of FIG. 5B identifies the first compartment 121A of FIG. 3B as associated with the first GUI section 422A using shading.

The second GUI section 422B of FIG. 5B is configured to display operating parameters 424B, 424B of the second compartment 121B of FIG. 3B. The second GUI section 422B of FIG. 5B displays a compartment nomenclature 426 identifying the second compartment 121B of FIG. 3B as "C2". The compartment icon 428 of the second GUI section 422B of FIG. 5B illustrates both the first compartment 121A and the second compartment 121B of FIG. 3B. The compartment icon 428 of the second GUI section 422B of FIG. 5B identifies the second compartment 121B of FIG. 3B as associated with the second GUI section 422B using shading.

The third GUI section 422C of FIG. 5B is configured to display operating parameters 424B, 424B of the third compartment 121C of FIG. 3B. The third GUI section 422C of FIG. 5B displays a compartment nomenclature 426 identifying the third compartment 121C of FIG. 3B as "C3". The compartment icon 428 of the third GUI section 422C of FIG. 5B illustrates the first compartment 121A, the second compartment 121B, and the third compartment 131C of FIG. 3B. The compartment icon 428 of the third GUI section 422C of FIG. 5B identifies the third compartment 121C of FIG. 3B as associated with the third GUI section 422C using shading.

Figure 5C:
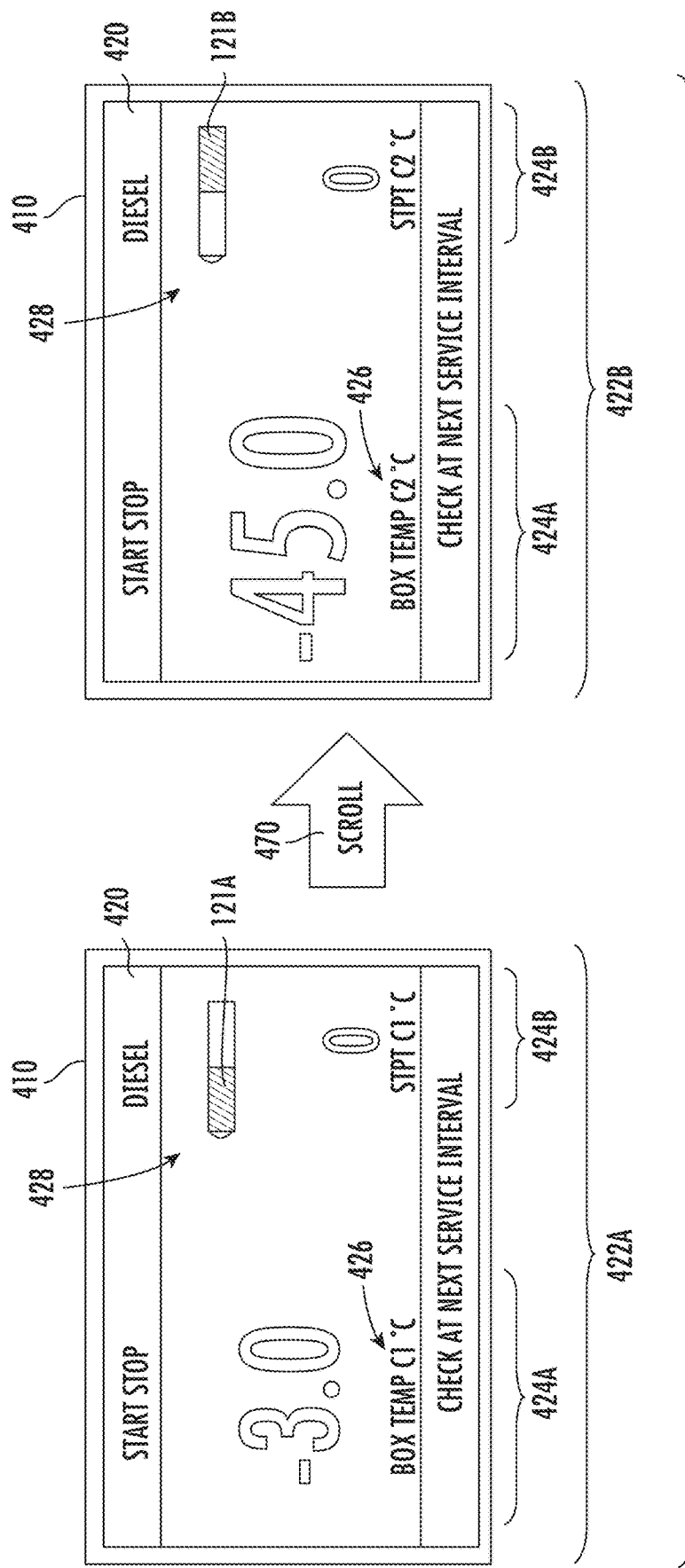
FIG. 5C is a schematic illustration of display generating a graphical user interface showing operational parameters for the compartment layout of FIG. 3C, according to an embodiment of the present disclosure.

FIG. 5C illustrates a GUI 420 for the refrigerated cargo space 119 of FIG. 3C that is subdivided into a first compartment 121A and a second compartment 121B. The GUI 420 of FIG. 5C scrolls 470 between the first GUI section 422A associated with the first compartment 121A of FIG. 3C and a second GUI section 422B associated with the second compartment 121B of FIG. 3C. The GUI 420 may scroll 470 between the first GUI section 422A and the second GUI section 422B automatically. For example, the first GUI section 422A may be displayed for a first time period and then the GUI 420 may scroll 470 to display the second GUI section 422B for a second time period before the GUI 420 scrolls 470 to display the first GUI section 422A. The GUI 420 may scroll 470 between the first GUI section 422A and the second GUI section 422B in response to a user input received from the input device 408. For example, a user may scroll between GUI sections 422A, 422B by pressing a button on the input device 408.

The first GUI section 422A of FIG. 5C is configured to display operating parameters 424A, 424B of the first compartment 121A of FIG. 3C. The first GUI section 422A of FIG. 5C displays a compartment nomenclature 426 identifying the first compartment 121A of FIG. 3C as "C1". The compartment icon 428 of the first GUI section 422A of FIG. 5C illustrates both the first compartment 121A and the second compartment 121B of FIG. 3C. The compartment icon 428 of the first GUI section 422A of FIG. 5C identifies the first compartment 121A of FIG. 3C as associated with the first GUI section 422A using shading.

The second GUI section 422B of FIG. 5C is configured to display operating parameters 424A, 424B of the second compartment 121B of FIG. 3C. The second GUI section 422B of FIG. 5C displays a compartment nomenclature 426 identifying the second compartment 121B of FIG. 3C as "C2". The compartment icon 428 of the second GUI section 422B of FIG. 5C illustrates both the first compartment 121A and the second compartment 121B of FIG. 3C. The compartment icon 428 of the second GUI section 422B of FIG. 5C identifies the second compartment 121B of FIG. 3C as associated with the second GUI section 422B using shading.

Figure 5D:
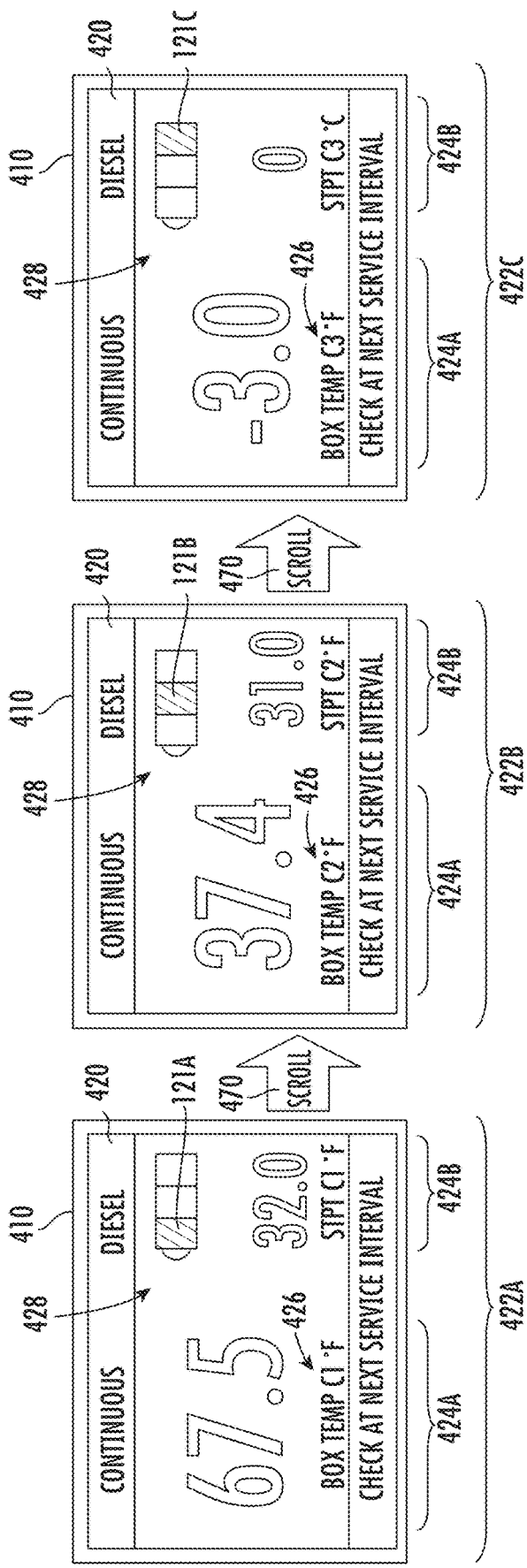
FIG. 5D is a schematic illustration of display generating a graphical user interface showing operational parameters for the compartment layout of FIG. 3D, according to an embodiment of the present disclosure.

FIG. 5D illustrates a GUI 420 for the refrigerated cargo space 119 of FIG. 3D that is subdivided into a first compartment 121A, a second compartment 121B, and a third compartment 121C. The GUI 420 of FIG. 5D scrolls 470 between the first GUI section 422A associated with the first compartment 121A of FIG. 3D, the second GUI section 422B associated with the second compartment 121B of FIG. 3D, and the third GUI section 422C associated with the third compartment 121C of FIG. 3D. The GUI 420 may scroll 470 between the first GUI section 422A, the second GUI section 422B, and the third GUI section 422C automatically. For example, the first GUI section 422A may be displayed for a first time period, then the GUI 420 may scroll 470 to display the second GUI section 422B for a second time period, then the GUI 420 may scroll 470 to display the third GUI section 422C for a third time period before the GUI 420 scrolls 470 to display the first GUI section 422A. The GUI 420 may scroll 470 between the first GUI section 422A, the second GUI section 422B, and the third GUI section 422C in response to a user input received from the input device 408. For example, a user may scroll between GUI sections 422A, 422B, 422C by pressing a button on the input device 408.

The first GUI section 422A of FIG. 5D is configured to display operating parameters 424A, 424B of the first compartment 121A of FIG. 3D. The first GUI section 422A of FIG. 5D displays a compartment nomenclature 426 identifying the first compartment 121A of FIG. 3D as "C1". The compartment icon 428 of the first GUI section 422A of FIG. 5D illustrates both the first compartment 121A and the second compartment 121B of FIG. 3D. The compartment icon 428 of the first GUI section 422A of FIG. 5D identifies the first compartment 121A of FIG. 3D as associated with the first GUI section 422A using shading.

The second GUI section 422B of FIG. 5D is configured to display operating parameters 424B, 424B of the second compartment 121B of FIG. 3D. The second GUI section 422B of FIG. 5D displays a compartment nomenclature 426 identifying the second compartment 121B of FIG. 3D as "C2". The compartment icon 428 of the second GUI section 422B of FIG. 5D illustrates both the first compartment 121A and the second compartment 121B of FIG. 3D. The compartment icon 428 of the second GUI section 422B of FIG. 5D identifies the second compartment 121B of FIG. 3D as associated with the second GUI section 422B using shading.

The third GUI section 422C of FIG. 5D is configured to display operating parameters 424B, 424B of the third compartment 121C of FIG. 3D. The third GUI section 422C of FIG. 5D displays a compartment nomenclature 426 identifying the third compartment 121C of FIG. 3D as "C3". The compartment icon 428 of the third GUI section 422C of FIG. 5D illustrates the first compartment 121A, the second compartment 121B, and the third compartment 131C of FIG. 3D. The compartment icon 428 of the third GUI section 422C of FIG. 5D identifies the third compartment 121C of FIG. 3D as associated with the third GUI section 422C using shading.

Figure 6:
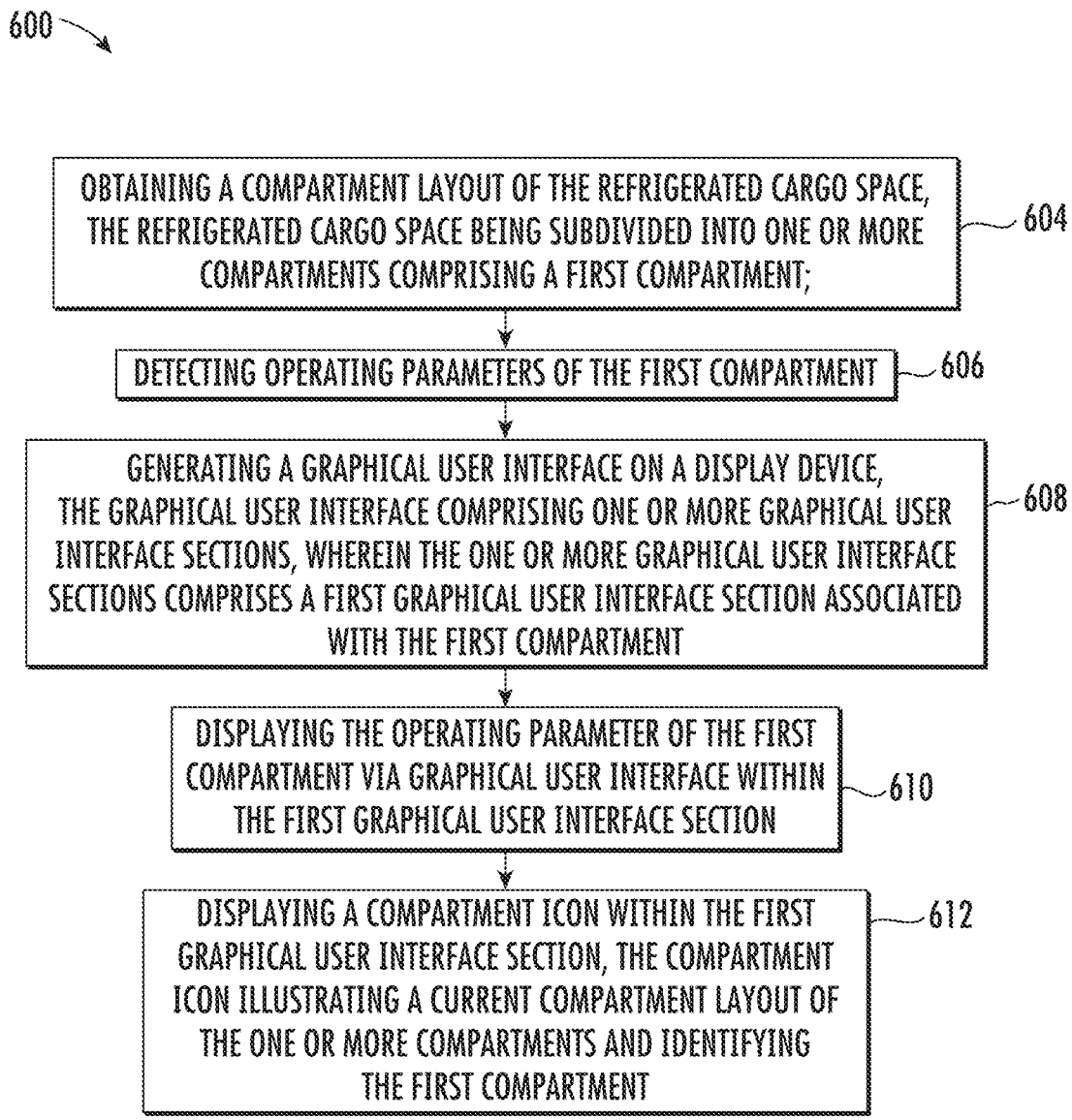
FIG. 6 is a flow process illustrating a method of monitoring operating parameters of a refrigerated cargo space within a transport refrigeration system of FIGS. 1 and 2, according to an embodiment of the present disclosure.

Referring now to FIG. 6, within continued reference to FIGS. 1-4, a flow process illustrating a method 600 of monitoring operating parameters of a refrigerated cargo space within a transport refrigeration system 200, according to an embodiment of the present disclosure.

At block 604, a compartment layout of the refrigerated cargo space is obtained. The refrigerated cargo space 119 subdivided into one or more compartments comprising a first compartment.

At block 606, operating parameters of the first compartment are detected. The operating parameter may include at least one of a temperature within the first compartment and a set point for the first compartment.

At block 608, a graphical user interface is generated on a display device. The graphical user interface comprising one or more graphical user interface sections. The one or more graphical user interface sections comprising a first graphical user interface section associated with the first compartment.

At block 610, the operating parameter of the first compartment are displayed via graphical user interface within the first graphical user interface section.

At block 612, a compartment icon is displayed within the first graphical user interface section. The compartment icon illustrating a current compartment layout of the one or more compartments and identifying the first compartment. The first compartment may be identified by the first graphical user interface by shading the first compartment within the current compartment layout of the graphical user interface.

The method 600 may also comprise: providing conditioned air to at least one of the one or more compartments or providing conditioned air to the one or more compartments.

The one or more compartments may further comprises a second compartment and the one or more graphical user interface sections may further comprises a second graphical user interface section associated with the second compartment The method 600 may further comprise: displaying the operating parameter of the second compartment via graphical user interface within the second graphical user interface section. The method 600 may additionally comprise: displaying a second compartment icon within the second graphical user interface section, the compartment icon illustrating a current compartment layout of the one or more compartments and identifying the second compartment.

While the above description has described the flow process of FIG. 6 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a refrigerated cargo space subdivided into one or more compartments comprising a first compartment;
a transportation refrigeration unit configured to provide conditioned air to each of the one or more compartments; and
a display configured to generate a graphical user interface comprising one or more graphical user interface sections, wherein the one or more graphical user interface sections comprises a first graphical user interface section associated with the first compartment,
wherein the first graphical user interface section displays operating parameters for the first compartment, and
wherein the first graphical user interface section displays a compartment icon illustrating a current compartment layout of the one or more compartments and identifies the first compartment;
wherein the one or more compartments further comprises a second compartment, wherein the one or more graphical user interface sections further comprises a second graphical user interface section associated with the second compartment, wherein the second graphical user interface section displays operating parameters for the second compartment;
wherein the second graphical user interface section displays a compartment icon illustrating a current compartment layout of the one or more compartments and identifies the second compartment;
wherein the current compartment layout of the one or more compartments includes the number and arrangement of the compartments.

2. The transport refrigeration system of claim 1, wherein the operating parameter include at least one of a temperature within the first compartment and a set point for the first compartment.

3. The transport refrigeration system of claim 1, wherein the first compartment is identified by the first graphical user interface by shading the first compartment within the current compartment layout of the graphical user interface.

4. The transport refrigeration system of claim 1, wherein the second graphical user interface section is displayed simultaneously with the first graphical user interface section.

5. The transport refrigeration system of claim 1, wherein graphical user interface scrolls between the first graphical user interface section and the second graphical user interface section.

6. A method of monitoring operating parameters of a refrigerated cargo space within a transport refrigeration system, the method comprising:
obtaining a compartment layout of the refrigerated cargo space, the refrigerated cargo space being subdivided into one or more compartments comprising a first compartment;
detecting operating parameters of the first compartment;
generating a graphical user interface on a display device, the graphical user interface comprising one or more graphical user interface sections, wherein the one or more graphical user interface sections comprises a first graphical user interface section associated with the first compartment;
displaying the operating parameter of the first compartment via graphical user interface within the first graphical user interface section; and
displaying a compartment icon within the first graphical user interface section, the compartment icon illustrating a current compartment layout of the one or more compartments and identifying the first compartment;
wherein the one or more compartments further comprises a second compartment, wherein the one or more graphical user interface sections further comprises a second graphical user interface section associated with the second compartment, and wherein the method further comprises:
displaying the operating parameter of the second compartment via graphical user interface within the second graphical user interface section;
displaying a second compartment icon within the second graphical user interface section, the compartment icon illustrating a current compartment layout of the one or more compartments and identifying the second compartment;
wherein the current compartment layout of the one or more compartments includes the number and arrangement of the compartments.

7. The method of claim 6, further comprising:
providing conditioned air to at least one of the one or more compartments.

8. The method of claim 6, further comprising:
providing conditioned air to the one or more compartments.

9. The method of claim 6, wherein the operating parameter include at least one of a temperature within the first compartment and a set point for the first compartment.

10. The method of claim 6, wherein the first compartment is identified by the first graphical user interface by shading the first compartment within the current compartment layout of the graphical user interface.

11. The method of claim 6, further comprising:
displaying the second graphical user interface section simultaneously with the first graphical user interface section.

12. The method of claim 6, further comprising:
displaying the second graphical user interface section and the first graphical user interface section separately, wherein graphical user interface scrolls between the first graphical user interface section and the second graphical user interface section.

13. A computer program product embodied on a non-transitory computer readable medium, the computer program product including instructions that, when executed by a processor, cause the processor to perform operations comprising:

obtaining a compartment layout of the refrigerated cargo space, the refrigerated cargo space being subdivided into one or more compartments comprising a first compartment;

detecting operating parameters of the first compartment;

generating a graphical user interface on a display device, the graphical user interface being sub-divided into one or more graphical user interface sections, wherein the one or more graphical user interface sections comprises a first graphical user interface section associated with the first compartment;

displaying the operating parameter of the first compartment via graphical user interface within the first graphical user interface section; and displaying a compartment icon within the first graphical user interface section, the compartment icon illustrating a current compartment layout of the one or more compartments and identifying the first compartment;

wherein the one or more compartments further comprises a second compartment, wherein the one or more graphical user interface sections further comprises a second graphical user interface section associated with the second compartment, and wherein the operations further comprise:

displaying the operating parameter of the second compartment via graphical user interface within the second graphical user interface section;

displaying a second compartment icon within the second graphical user interface section, the compartment icon illustrating a current compartment layout of the one or more compartments and identifying the second compartment;

wherein the current compartment layout of the one or more compartments includes the number and arrangement of the compartments.

14. The computer program product of claim 13, wherein the operations further comprise:

providing conditioned air to at least one of the one or more compartments.

15. The computer program product of claim 13, wherein the operations further comprise:

providing conditioned air to the one or more compartments.

* * * * *